(12) United States Patent
Yamamoto

(10) Patent No.: US 7,146,382 B2
(45) Date of Patent: Dec. 5, 2006

(54) IMAGE PROCESSING APPARATUS AND ITS METHOD AND SERVER APPARATUS

(75) Inventor: Kunihiro Yamamoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 425 days.

(21) Appl. No.: 10/125,506

(22) Filed: Apr. 19, 2002

(65) Prior Publication Data

US 2002/0156775 A1 Oct. 24, 2002

(30) Foreign Application Priority Data

Apr. 20, 2001 (JP) ............... 2001-122862
Mar. 28, 2002 (JP) ............... 2002-091639

(51) Int. Cl.
  *G06F 17/00* (2006.01)
  *G06F 7/00* (2006.01)
  *H04N 7/10* (2006.01)

(52) U.S. Cl. ............... 707/104.1; 707/10; 348/7
(58) Field of Classification Search ............ 707/4–10; 345/745; 709/203, 217; 348/7; 340/5.82
See application file for complete search history.

(56) References Cited

U.S. PATENT DOCUMENTS 6,499,137 B1 * 12/2002 Hunt ............... 717/164
6,601,064 B1 * 7/2003 Nag et al. ............ 707/4
6,704,466 B1 3/2004 Yamamoto et al. ...... 382/305
6,721,741 B1 * 4/2004 Eyal et al. ............ 707/10
6,771,290 B1 * 8/2004 Hoyle ............... 345/745

FOREIGN PATENT DOCUMENTS

JP 2000-076270 3/2000
JP 2001-014333 1/2001

OTHER PUBLICATIONS

Mei Kodama, et al., "A Study on the Image Matching Methods in MPS Video Searching System", ITE Technical Report, vol. 23, No. 80, pp. 55-60, the Institute of Image Information and Television Engineers, Dec. 17, 1999 (w/Abstract).

* cited by examiner

*Primary Examiner*—Uyen Le
*Assistant Examiner*—Susan Y Chen
(74) *Attorney, Agent, or Firm*—Fitzpatrick, Cella Harper & Scinto

(57) ABSTRACT

In a conventional client/server type image database for centralized management of image data, upon transmission of image as a search result from a server to a client, since it takes time for the client to display the image due to a network band, the image search cannot be always performed efficiently. Accordingly, in a client process, a feature amount is extracted from a search image, and the extracted feature amount is transmitted to a server process. Then, the result of search by the server process based on the feature amount and a GUID specifying the image database are received from the server process, and image data which is not cached in the client, is requested from the server process based on the search result and the GUID.

8 Claims, 13 Drawing Sheets

IMAGE PROCESSING APPARATUS AND ITS METHOD AND SERVER APPARATUS

FIELD OF THE INVENTION

The present invention relates to an image processing apparatus and its method and a server apparatus, and more particularly, to image processing of performing an image search on an image database holding plural images.

BACKGROUND OF THE INVENTION

Various search methods have been proposed for searching a database holding a number of image data for a desired image. These search methods are briefly classified into the following two methods.
(1) Making a search based on non-image information such as a keyword or image sensing date linked to an image
(2) Making a search based on a feature amount (luminance/chrominance information, an image frequency, a histogram and the like) of image itself In the latter method which is called a "similar image search", an image is presented to the database, and an image search is performed with the feature amount of the image as a search key. This method provides an intuitive and simple search interface to a user who does not have special image processing knowledge.

It is ineffective that plural users independently have a huge image database. Accordingly, various client/server type image databases have been proposed and practically used in centralized management of image data. However, upon transmission of image as a search result from a server to a client, since it takes time for the client to display the image due to a network band, the image search cannot be always performed efficiently.

SUMMARY OF THE INVENTION

The present invention has been made so as to solve the above-described problems independently or at once and to perform an image search on an image database efficiently.

The above objects are attained by providing an image processing method of performing an image search on an image database having plural images, held in a server, comprising the steps of: extracting a feature amount from a search image; transmitting the extracted feature amount to the server; receiving the result of search on the server based on the feature amount and an ID specifying the image database, from the server; and requesting image data from the server based on the result of search and the ID.

Further, provided is an image processing method of performing an image search on an image database having plural images, comprising the steps of: receiving a feature amount of a search image from a client; performing a search based on the received feature amount and feature amounts of the respective images stored in the image database; transmitting the result of search and an ID specifying the image database to the client; receiving a request for image data from the client; and reading the requested image data from the image database and transmitting the image data to the client.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinbelow, an image search apparatus according to preferred embodiments of the present invention will now be described in detail in accordance with the accompanying drawings.

FIRST EMBODIMENT

Structure

Figure 1:
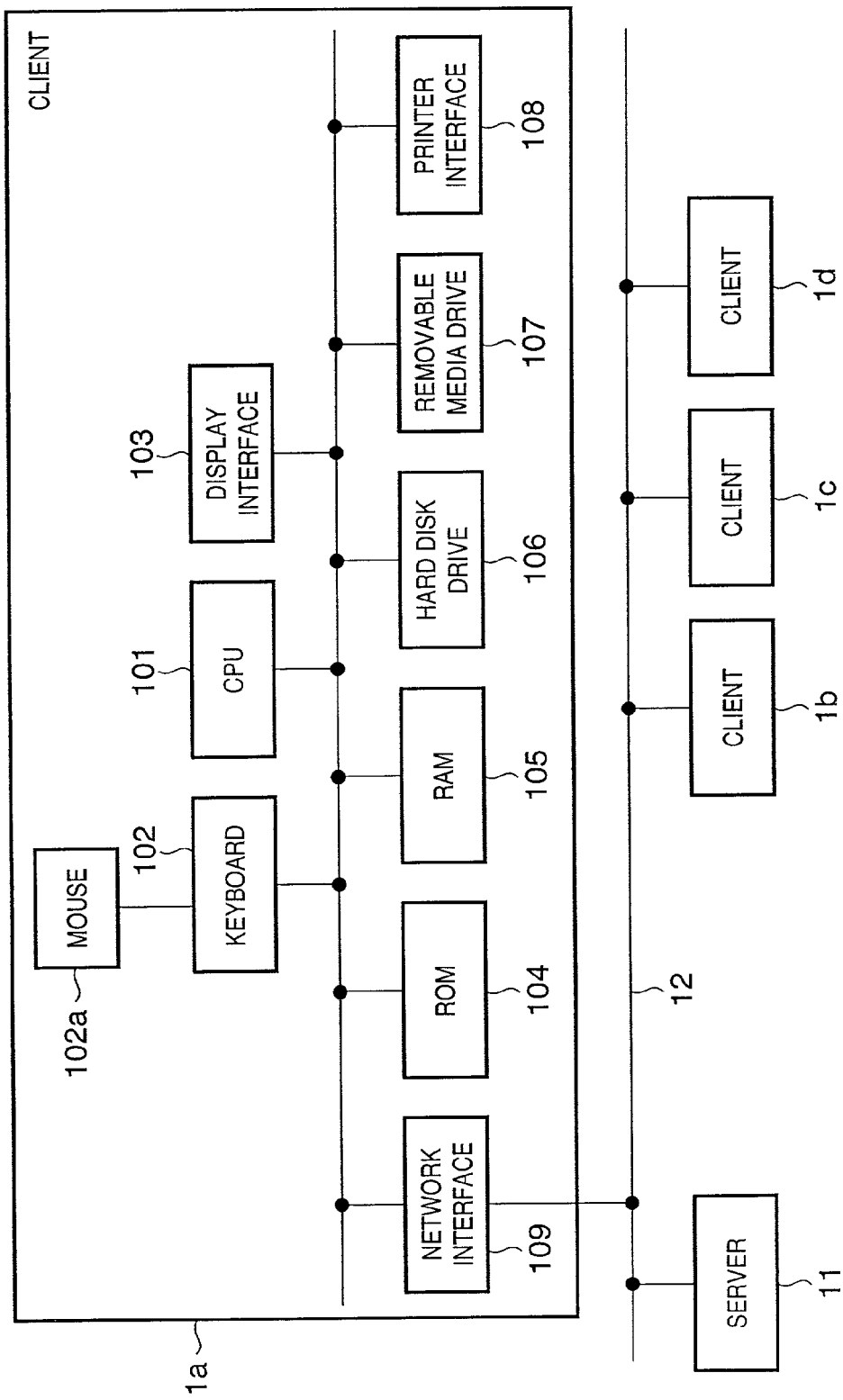
FIG. 1 is a block diagram showing the configuration of a computer system realizing an image search apparatus according to an embodiment of the present invention.

FIG. 1 is a block diagram showing the configuration of a computer system realizing the image search apparatus of the embodiment.

In FIG. 1, numerals 1a to 1d denote client computers (hereinbelow, each referred to as a "client"); and 11, a server computer (hereinbelow referred to as a "server"). The clients and the server 11 are interconnected by a network 12.

FIG. 1 shows 4 clients and 1 server, however, an arbitrary number of clients and an arbitrary number of servers can be connected to the network 12. For example, different servers may be provided for respective databases, or plural servers to provide the same database may be set in geographically distant positions.

The details of the network 12 will be omitted since the construction there of is well known. A local area network (LAN), a wide area network (WAN), an Intranet or the Internet may be used as the network 12.

As the clients and the server 11 which are computer machines have similar constructions, the construction of the client 1a will be described and the constructions of the other clients and the server 11 will be omitted.

In FIG. 1, a CPU 101 controls the entire system while utilizing a RAM 105 as a work memory, in accordance with a program stored in a ROM 104 and/or a hard disk drive 106. Further, the CPU 101 performs image search processing to be described later based on a program stored in the hard disk drive 106, in accordance with a user's designation inputted via a keyboard 102 and/or a mouse 102a.

A display interface 103 connected to a display such as a CRT or an LCD displays the progress, the result and the like of processing performed by the CPU 101. A removable media drive 107 is utilized mainly for writing of file from a removable medium to the hard disk drive 106, or writing of file read from the hard disk drive 106 into the removable medium. A floppy disk (FD), a CD-ROM, a CD-R, a CD-R/W, a DVD-ROM, a DVD-R/W, a DVD-RAM, an MO, a memory card or the like, can be utilized as the removable medium.

A printer interface 108 is connected to a printer such as a laser-beam printer or an ink-jet printer. A network interface 109 is an interface for connection between the computer machines to the network 12.

Search Processing

Figure 2:
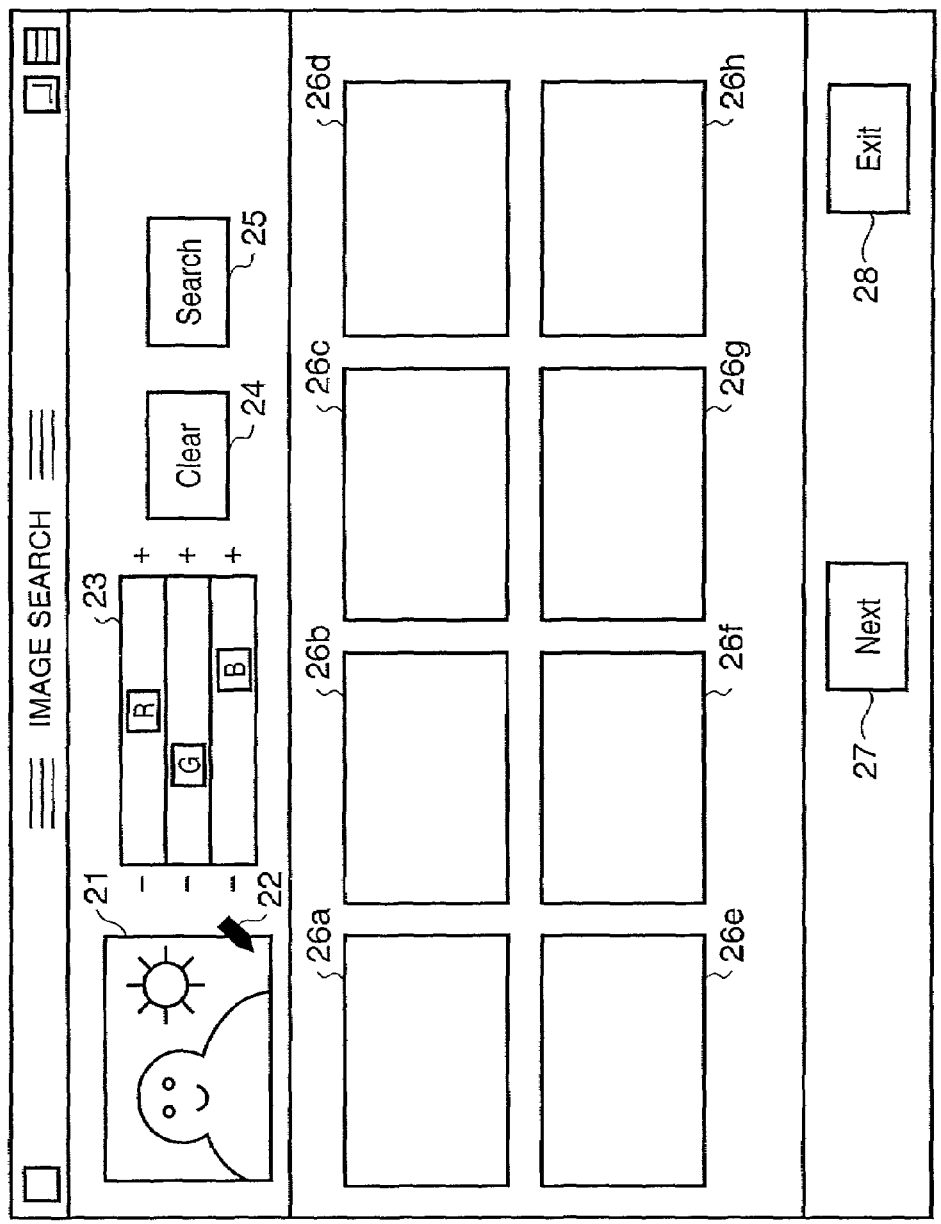
FIG. 2 is an example of operation screen image displayed on a display of a client upon execution of search processing.

FIG. 2 shows an operation screen image displayed on a display of the client upon execution of search processing. Numeral 21 denotes a drawing area; 22, a cursor of a drawing tool (an icon of pencil tool is shown in the figure); 23, slider bars for color designation; 24, a clear button; 25, a search execution button; 26a to 26h, icons or reduced images of search hit images; 27, a button to display the next candidate; and 28, a button to end the processing.

The user draws an illustration similar to a desired search image in the drawing area 21 by using the drawing tool realized by software. The outline of operation of illustration drawing is as follows. The user fills in the drawing area 21 with white by depressing the clear button 24, if necessary, then designates RGB values by using the slider bars 23 for designation of drawing color, and moves the cursor 22 by using a pointing device, thus draws a free curve in the drawing area 21. The user completes the illustration by repeating color designation and line drawing in accordance with necessity.

Note that if the user wants to see the image in detail, the user double-clicks any one of image icons or reduced images 26a to 26h. By this designation, an image corresponding to the clicked image icon or reduced image is displayed in correspondence with a designated size, an original size or a screen size. Although the details will be omitted, the user may select an image icon or reduced image and forward image data of the selected image icon or reduced image to another process (image processing or print processing) running on the client.

Figure 3:
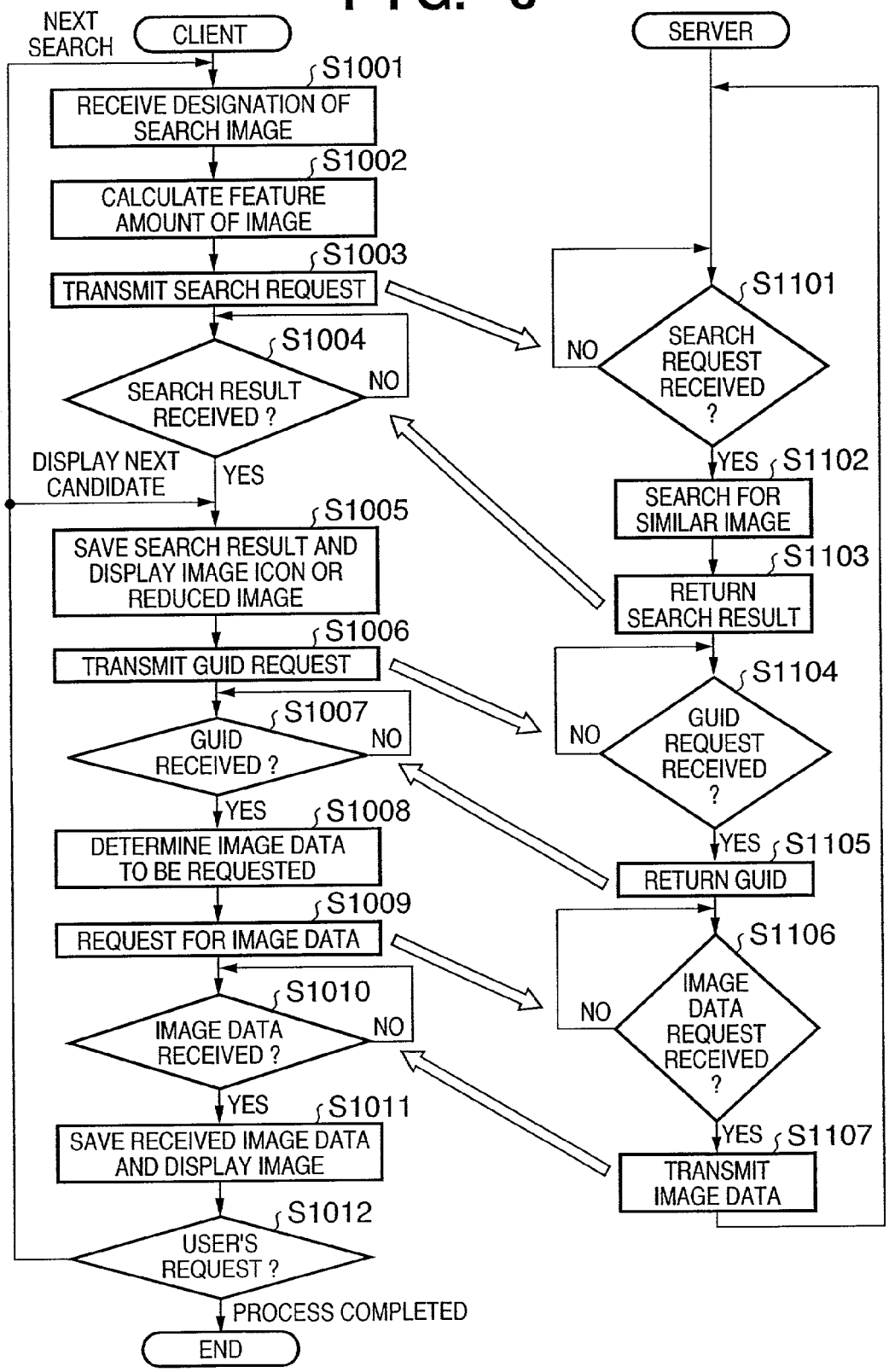
FIG. 3 is a flowchart showing an outline of image search.

FIG. 3 is a flowchart showing the outline of the image search including process on the client and that on the server 11. The server process is performed on the server 11 and the client process is performed on the client.

Client Process

In the client process, when the user draws an illustration similar to a desired search image in the drawing area 21 and depresses the search execution button 25, the designation of search image is received at step S1001. Then at step S1002, a feature amount of the image is calculated from the illustration. At step S1003, a request for a search based on the calculated feature amount is transmitted to the server process.

More particularly, the processing at step S1003 is transmission of feature amount d( ) to be described in detail later to the server process by inter-computer communication. As the illustration as a search key is not directly transmitted but its feature amount is extracted and transmitted, the data amount on the network 12 can be greatly reduced, and the traffic on the network 12 can be suppressed.

Next, at step S1004, it is determined whether or not a search result T( ) to be described in detail later has been received from the server process. If it is determined that the search result T( ) has been received, the search result T( ) is stored into the hard disk drive 106 at step S1005, and icons or reduced images 26a to 26h of search hit images as shown in FIG. 2 are displayed. If there are few hits in the search, only a part of the icon or reduced images 26a to 26h may be displayed. At step S1006, a request for Globally Unique IDentifier (GUID) of the database is transmitted to the server process.

GUID is a 128-bit numerical value defined by well-known Component Object Model (COM), and ensured as a unique value in time space within a practical range. The server 11 holds the GUID, and it notifies the client of the GUID in accordance with necessity, thereby the client can specify the corresponding database.

Next, at step S1007, it is determined whether or not the GUID has been received from the server process. If it is determined that the GUID has been received, the process proceeds to step S1008, and image data to be requested from the server 11, i.e., image data corresponding to the image icon or reduced image selected by the user, is determined based on the GUID. At step S1009, the image data is requested from the server process.

At step S1010, it is determined whether or not the image data has been received from the server process. If it is determined that the image data has been received, the process proceeds to step S1011, at which the received image data is stored into the hard disk drive 106 or the removable medium set in the removable media drive 107, and the image is displayed. Note that if the removable medium is utilized, a medium may be prepared for each GUID.

Next, at step S1012, the user's request is determined. For example, if it is determined that the end button 28 has been depressed, the process ends; if it is determined that the next candidate button 27 has been depressed, the process proceeds to step S1005; or if it is determined that the clear button 24 has been depressed, the process returns to step S1001.

Server Process

In the server process, at step S1101, it is determined whether or not the search request has been received from the client process. If it is determined that the search request has been received, the process proceeds to step S1102, at which the search for a similar image is performed based on a feature amount attached to the request. At step S1103, the search result is returned to the client process.

Next, at step S1104, it is determined whether or not the GUID request has been received from the client process. If it is determined that the GUID request has been received, the process proceeds to step S1105, at which the GUID of the database is returned to the client process.

Next, at step S1106, it is determined whether or not the image data request has been received. If it is determined that the image data request has been received, the process proceeds to step S1107, at which the requested image data is read from the hard disk drive 106 or the like, and transmitted to the client process. Then the process returns to step S1101.

Designation of Search Image

Figure 4:
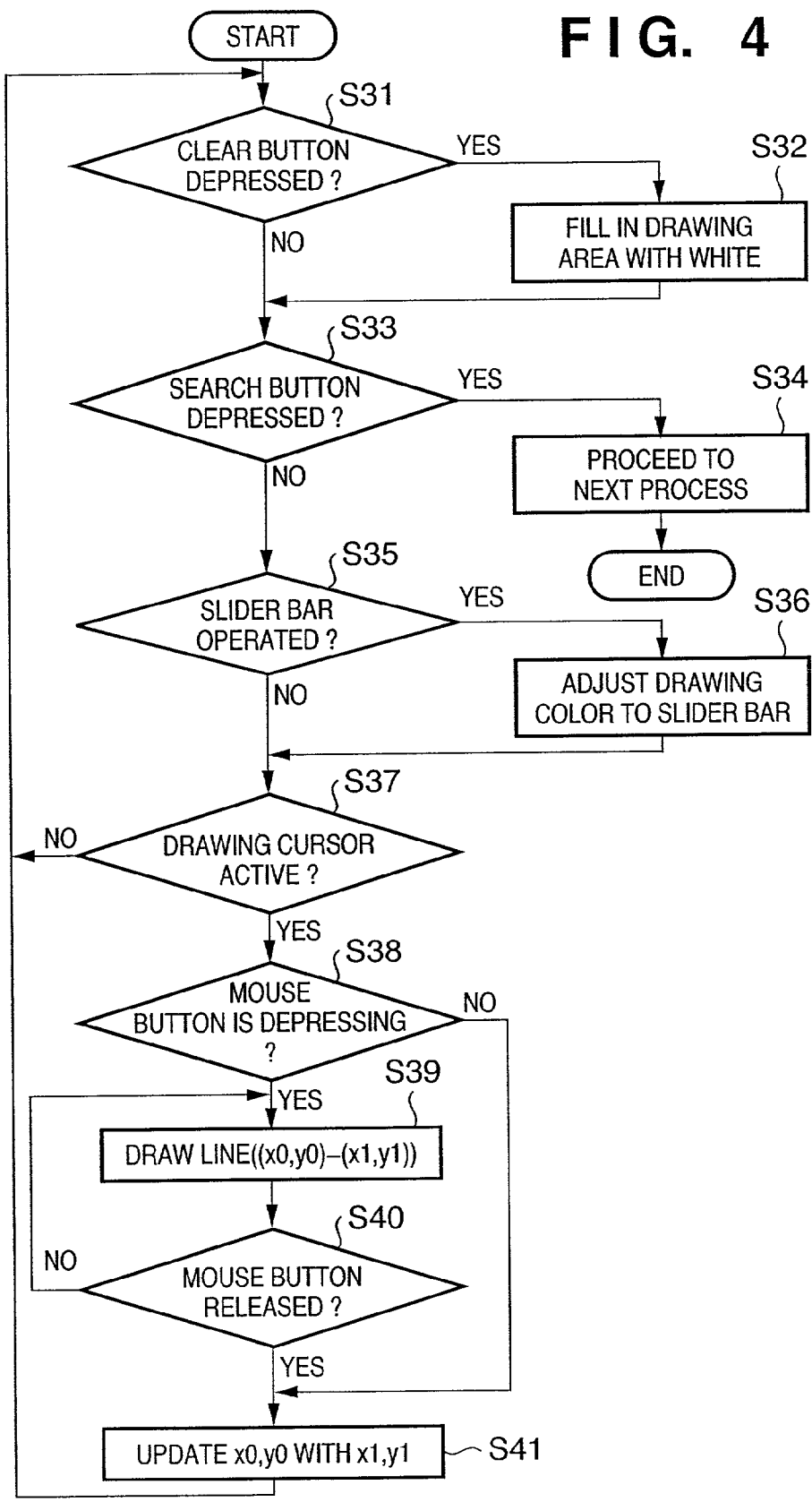
FIG. 4 is a flowchart showing the details of designation of search image.

FIG. 4 is a flowchart showing the details of designation of search image (step S1001). Note that x0 and y0 are variables for storing a designation position of the drawing cursor 22, and x1 and xy, variable for storing a current position of the drawing cursor 22, and sequentially updated in correspondence with movement of the drawing cursor 22.

At step S31, it is determined whether or not the clear button 24 has been depressed. If it is determined that the clear button 24 has been depressed, the entire drawing area 21 is filled in with white at step S32. Next, at step S32, it is determined whether or not the search button 25 has been depressed. If it is determined that the search button 25 has been depressed, the process proceeds to the above-described processing at step S1002, at step S34. Further, at step S35, it is determined whether or not the slider bars 23 have been operated. If it is determined that the slider bars 23 have been operated, the process proceeds to step S36, at which the drawing color is adjusted to the setup status of the slider bars 23.

Further, at step S37, it is determined whether or not the drawing cursor 22 is active. If it is determined that the drawing cursor 22 is active, the process proceeds to step S38, at which it is determined whether or not the mouse button is depressing. Note that if the mouse cursor is within the drawing area 21, the drawing cursor 22 is active.

If the drawing cursor 22 is active and the mouse button is depressed, the process proceeds to step S39, at which a line in the drawing color is drawn between the coordinates (x0,y0) and (x1,y1) until it is determined at step S40 that the mouse button has been released. If the mouse button has not been depressed or upon completion of line drawing, the coordinates x0 and y0 are updated with the coordinates x1 and y1 at step S41.

By the processing from step S37 to S41, if the mouse button is depressed, a line is drawn from the designation position of the drawing cursor 22 upon depression of the mouse button as a start point to the current position of the drawing cursor 22. Then when the mouse button is released, the line at the time is fixed. If it is determined at step S38 the mouse button is not depressed, the current positions x1, y1 of the drawing cursor 22 is set to x0, y0, and the drawing cursor 22 is simply moved without line drawing.

Note that it may be arranged such that even if the search button 25 is not depressed, an image search is performed upon e.g. addition of line to the illustration, in correspondence with illustration drawing in the drawing area. In this case, the client process may instruct the server process to perform an image search by background processing without explicitly performing the image search, and when the search button 25 has been depressed, may receive the search result. If the server 11 has a sufficiently high processing capability, search time can be reduced.

Feature Amount of Image

Figure 5:
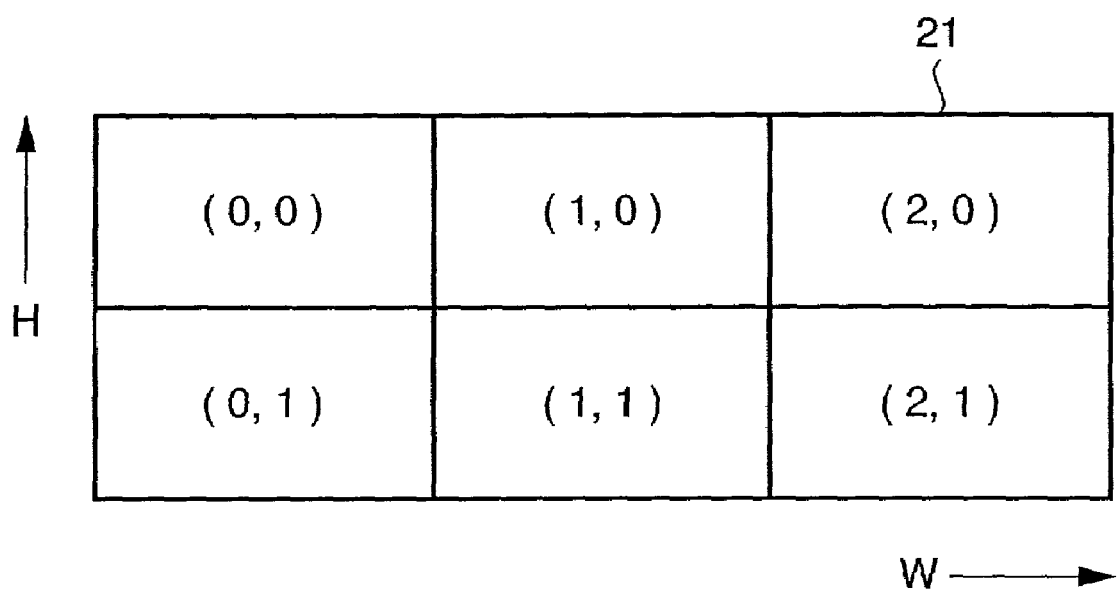
FIG. 5 is a table showing an example of division of drawing area.

FIG. 5 shows an example of division of the drawing area 21. The drawing area 21 has horizontal W pixels and vertical H pixels. The drawing area 21 is horizontally divided into 3 areas and vertically divided into 2 areas, i.e., 6 areas labeled sequentially from an upper left area, (0,0), (1,0), . . . , (2,1). RGB mean values of these areas are calculated, and the total 18 numerical values are used as an image feature amount of illustration.

Figure 6:
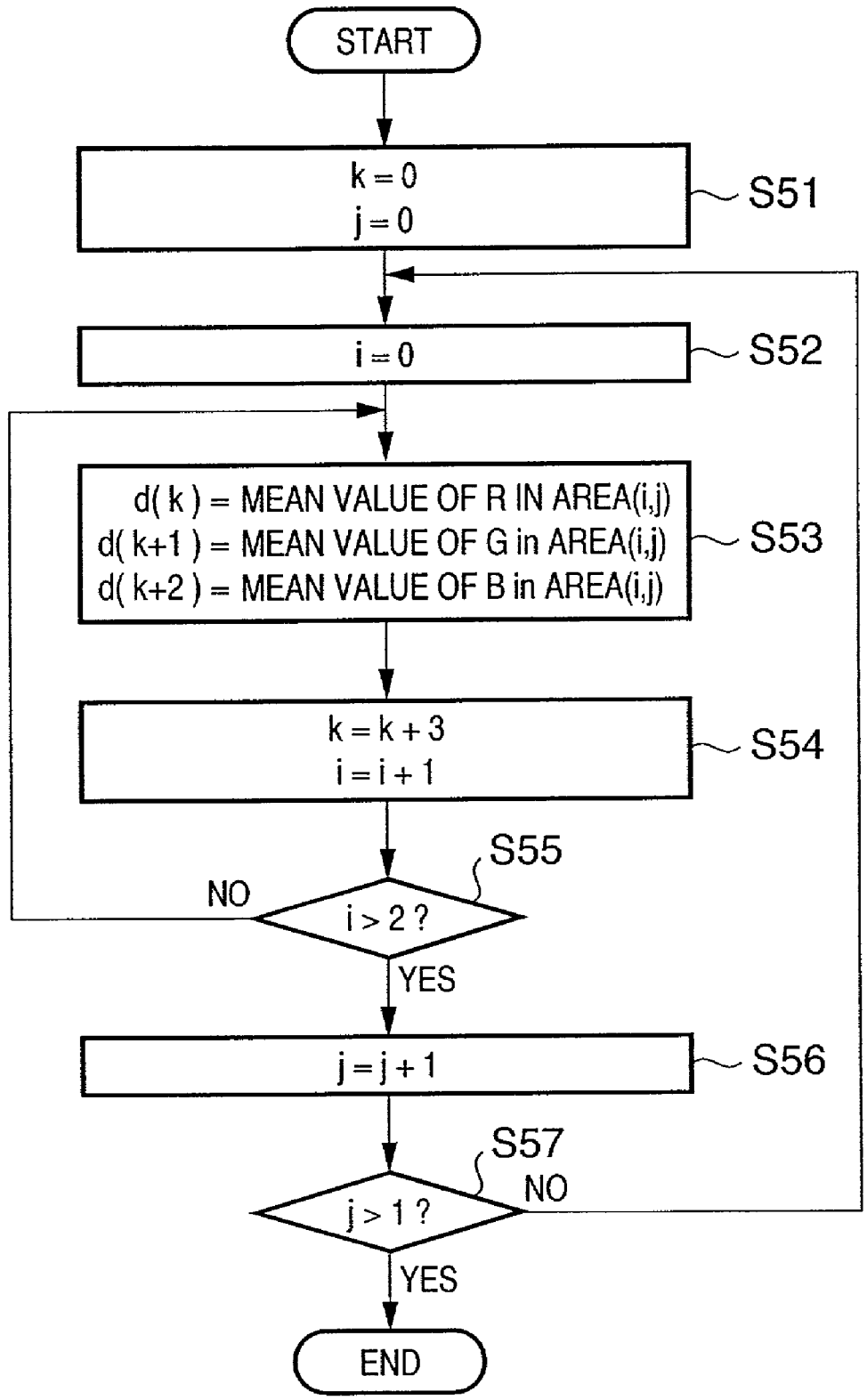
FIG. 6 is a flowchart showing processing for calculating a feature amount.

FIG. 6 is a flowchart showing processing for calculating the feature amount.

At step S51, variables k and j are initialized to zero, and at step S52, a variable i is initialized to zero. Then at step S53, in an array d, the red (R) mean value is substituted into a k-th element d(k), the green (G) mean value is substituted into an element d(k+1), and the blue (B) mean value is substituted into an element d(k+2).

Next, at step S54, the variable k is incremented by 3, and the variable i is incremented by 1. Then at step S55, it is determined whether or not i>2 holds. If it is determined that i>2 does not hold, the process returns to step S53, while if it is determined that i>2 holds, proceeds to step S56, at which the variable j is incremented by 1. Then at step S57, it is determined whether or not j>1 holds. If it is determined that j>1 holds, the calculation of feature amount ends, while if it is determined that j>1 does not hold, the process returns to step S52.

When the above-described process has been completed, the image feature amount of the illustration is stored into the array d( ) having 18 elements. In this example, the drawing area is divided into 6 equal rectangular areas for calculation of feature amount, however, the divided areas are not limited to equal areas nor rectangular areas but may be areas having more complicated shape. Further, the number of divided areas is not limited to 6. If the number of divided areas is incremented/decremented, the number of elements of the feature amount is not 18 but incremented/decremented in correspondence with the number of divided areas.

Figure 7:
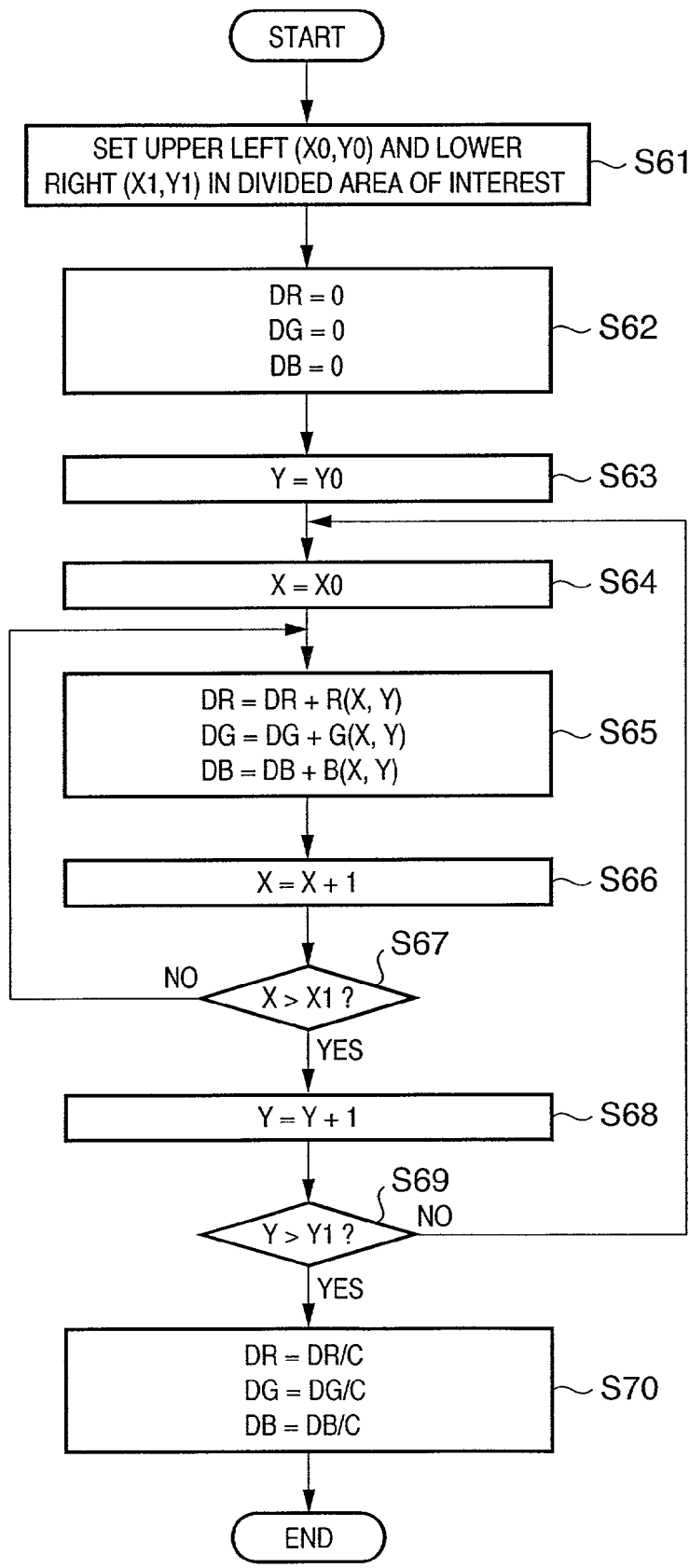
FIG. 7 is a flowchart showing processing for calculating RGB mean values in each area.

FIG. 7 is a flowchart showing processing for calculating the RGB mean values in each area. Note that image data is stored in arrays R(X,Y), G(X,Y) and B(X,Y). In this example, $0 \leq X < W$ hold and $0 \leq Y < H$ hold, and an upper left corner of divided area is an origin point (0,0).

The processing in FIG. 7 calculates the mean values in partial areas $X0 \leq X < X1$ and $Y0 \leq Y < Y1$, and the calculated mean values are stored into variables Dr, DG and DB. As an upper left corner point (X0,Y0) and lower right corner point (X1, Y1) in each divided area (i,j) are expressed as follows, constants X0, X1, Y0 and Y1 are initialized by the following expressions prior to execution of the processing in FIG. 7.

$$X0 = W \times i/3, \quad Y0 = H \times j/2$$

$$X1 = W \times (i+1)/3 - 1, \quad Y1 = H \times (j+1)/2 - 1$$

At step S61, the upper left and lower right corner points of a divided area of interest are set in accordance with the above expressions. At step S62, the variables DR, DG and DB are initialized to zero. At step S63, the variable Y is initialized to Y0, and at step S64, the variable X is initialized to X0.

Next, at step S65, R(X,Y) is added to the variable DR; G(X,Y), to the variable DG; B(X,Y), to the variable DB. Then, at step S66, 1 is added to the variable X. At step S67, it is determined whether or not X>X1 holds. If it is determined that X>X1 holds, the process proceeds to step S68, otherwise, returns to step S65.

At step S68, 1 is added to the variable Y. At step S69, it is determined whether or not Y>Y1 holds. If it is determined that Y>Y1 holds, the process proceeds to step S70, otherwise, returns to step S64.

At step S70, the variables DR, DG and DB are divided by the number of pixels c=(X1−X0+1)×(Y1−Y0+1), and the mean values of pixel values in the divided area (i, j)

Determination of Requested Image Data

In the client process, image data cached in the hard disk drive 106 of the client is referred to at step S1008, and it is determined whether or not transmission of image data is to be requested from the server 11.

Figure 8:
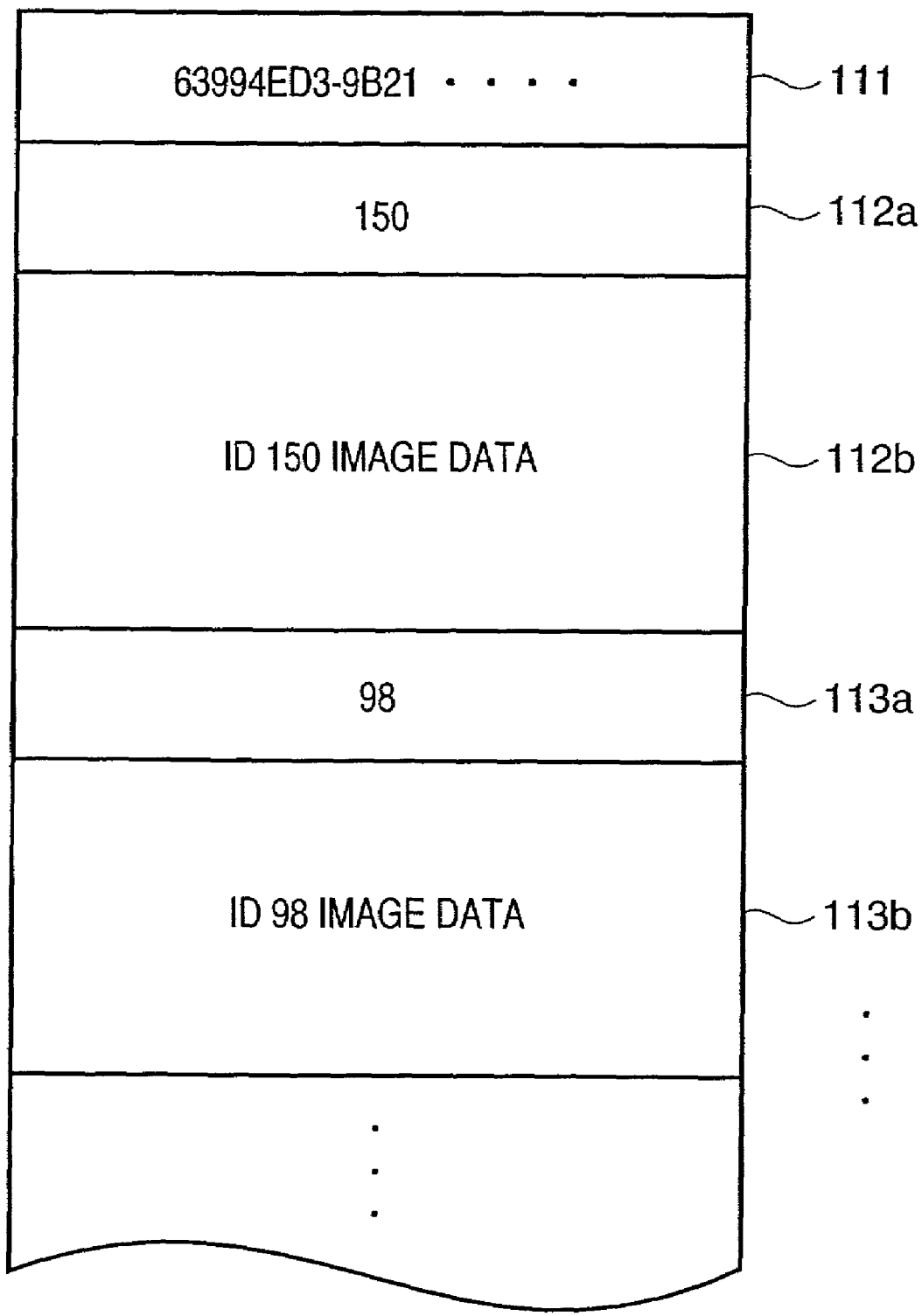
FIG. 8 is a table showing the structure of image data file cached by the client.

FIG. 8 shows the structure of image data file cached by the client. Numeral 111 denotes a GUID; and 112*a* and 112*b*, 113*a* and 113*b*, . . . , IDs of cached images and image data of the IDs. The image data file is generated for each image database accessed by the client, and the cache corresponding to each image database can be discriminated by the GUID 111 at the head of the cache.

Accordingly, in the client process, an image data file having the same GUID as that received at step S1006 is found, and the ID cached in the image data file is compared with the search result T( ). Then, if the ID included in the search result T( ) corresponds with the ID cached in the image data file, it is determined that it is not necessary to request transmission from the server 11 since an image can be displayed by using the cached image data. Accordingly, a request is made of the server 11 for transmission of image data having an ID, which does not correspond with any of the IDs cached in the image data file, i.e., image data having an ID which is not cached in the image data file.

Display of Image Icon or Reduced Image

As the image icons or reduced images 26*a* to 26*h*, the similar images found by the search in the above-described processing are displayed in reduced form. The image icons are arrayed in the order of similarity such that the icon or reduced image 26*a* corresponds to image data having an image number T(0) with the highest level of similarity; and the icon or reduced image 26*b* corresponds to image data having an image number T(1) with the next highest level of similarity. To display the image icons, reduced data may be generated from the original image data, however, in use of image format which has low-resolution image data for icon display such as FlashPix, the low-resolution data can be utilized.

Search for Similar Image

Next, the search for a similar image based on the image feature amount d( ) will be described.

The hard disk drive 106 of the server 11 holds image data for N($\geq$0) images. The feature amounts of these images are calculated in advance by the above-described method, and stored, with linkages to the image data, in the hard disk drive 106. Note that the image data may be in a standard file format such as well-known JPEG or FlashPix format or a file format of a so-called Relational Database Management System (RDBMS).

The image feature amount is stored in a two-dimensional array D(n,i) ($0 \leq n < N$, $0 \leq i < 18$) having a size of N×18. An inter-image distance S(n) between a search image and the n-th image is defined by the following expression. As the inter-image distance S(n) is shorter, the image similarity is determined as higher.

$$S(n) = \Sigma_i \{D(n,i) - d(i)\}^2$$

First, inter-image distances S(n) ($0 \leq n < N$) between all the N images and the search image are calculated. Next, M images ($0 \leq M \leq N$) are selected sequentially from an image having the minimum inter-image distance S(n), thus similar images are found.

Figure 9:
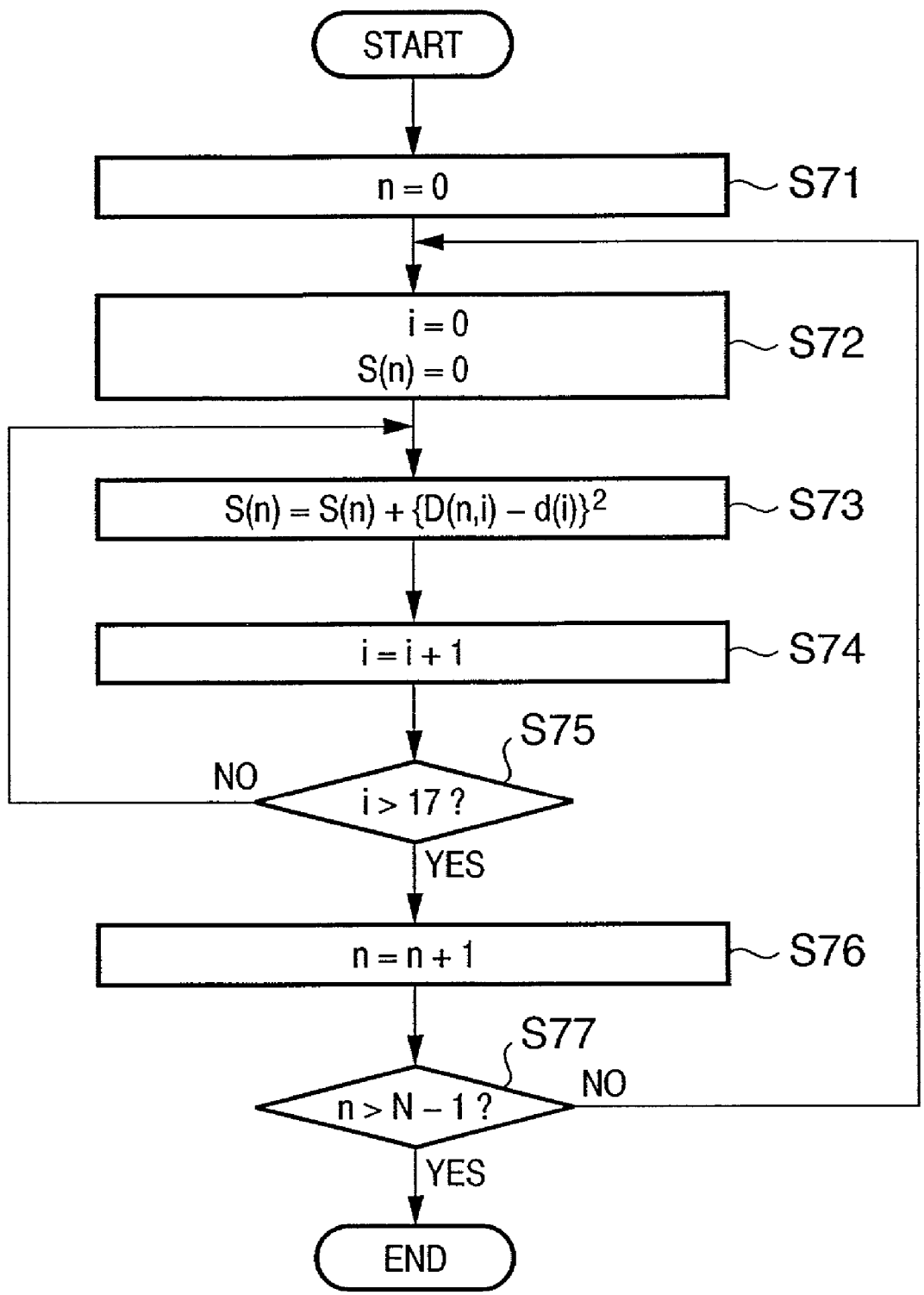
FIG. 9 is a flowchart showing calculation of an inter-image distance.

FIG. 9 is a flowchart showing the calculation of the inter-image distance.

At step S71, the variable n is initialized to zero, and at step S72, the variable i and the inter-image distance S(n) are initialized to zero. Then at step S73, the square of difference between D(n,i) and d(i) is added to S(n). At step S74, 1 is added to the variable i. At step S75, it is determined whether or not i>17 holds. If it is determined that i>17 holds, the process proceeds to step S76, otherwise, returns to step S73. Next, at step S76, 1 is added to the variable n. At step S77, it is determined whether or not n>N−1 holds. If n>N−1 holds, the process ends, otherwise, returns to step S72.

By the above-described processing, the inter-image distances between the search image and the N images stored in the hard disk drive 106 are stored in the array S(n).

Figure 10:
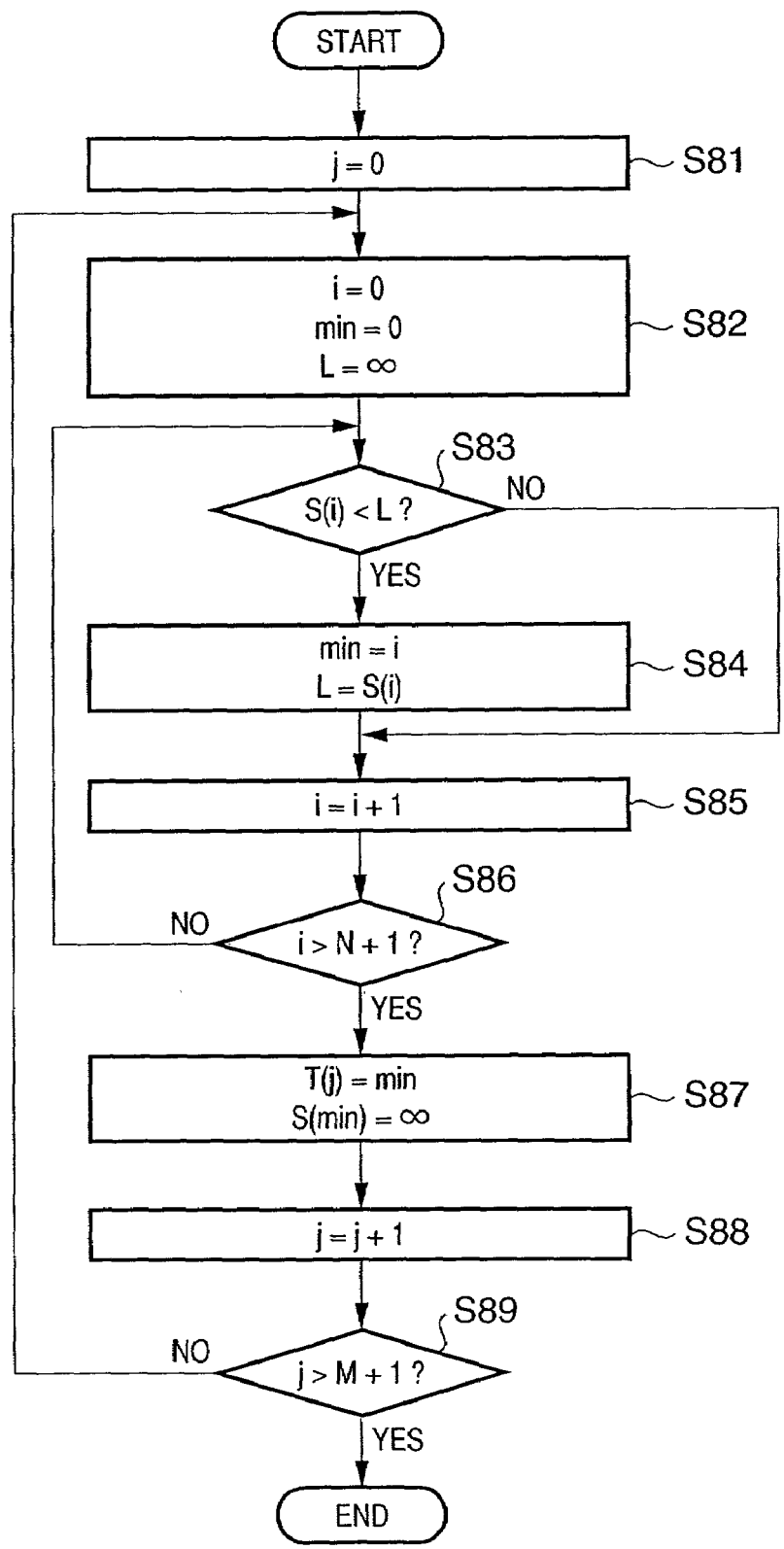
FIG. 10 is a flowchart showing processing for sequentially selecting M images from one having a minimum inter-image distance and storing image numbers (image IDs) into an array T( ) and FIG. 11 is a table showing the structure of image database of a server.

FIG. 10 is a flowchart showing the processing for sequentially selecting M images from one having the minimum inter-image distance and storing image numbers (image IDs) into the array T( ).

At step S81, the variable j is initialized to zero. At step S82, the variables i and min are initialized to zero, and a variable L is initialized to a sufficiently large value (a symbol ∞ in FIG. 10). Then, at step S83, it is determined whether or not S(i)<L holds. If it is determined that S(i)<L holds, the process proceeds to step S84, otherwise, proceeds to step S85.

At step S84, the value of the variable i is substituted into the variable min, and the value of S(i) is substituted into the variable L. At step S85, 1 is added to the variable i. Then at step S86, it is determined whether or not i>N+1 holds. If it is determined that i>N+1 holds, the process proceeds to step S87, otherwise, returns to step S83.

At step S87, the value of the variable min is substituted into T(j), and the sufficiently large value (the symbol ∞ in FIG. 10) is substituted into S(min). At step S88, 1 is added to the variable j. At step S89, it is determined whether or not j>M+1 holds. If it is determined that j>M+1 holds, the process ends, otherwise, returns to step S82.

By the above processing, the image numbers (image IDs) are sequentially stored into the array T(j) (0<j<M) in descending order of similarity to the search image.

Figure 11:
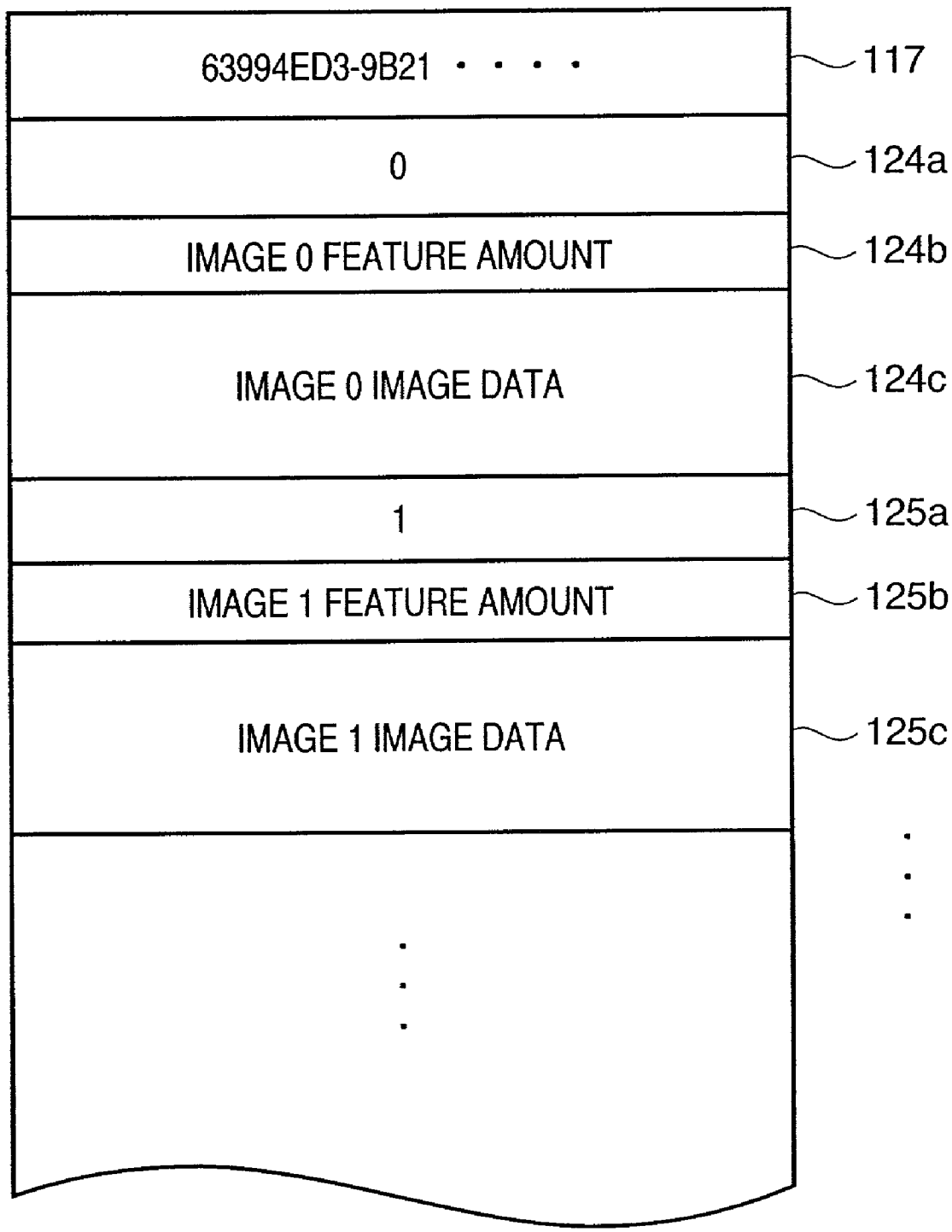

FIG. 11 shows the structure of the image database of the server 11. Numeral 117 denotes the GUID; 124*a*, 124*b* and 124*c*, 125*a*, 125*b* and 125*c*, . . . , image IDs, image feature amounts and image data bodies in the database. The server 11 reads image data requested from the client out of the image database, and transmits the image data to the client by the inter-computer communication.

Note that in FIG. 11, images having image IDs "0" and "1" are stored, however, the image IDs are not necessarily continuous numbers and they are not necessarily sequentially stored in the ascending order.

Note that in the above-described server process, there is one client process, however, since plural clients respectively execute the client process, the server process must monitor communication requests from all the clients. Accordingly, it is desirable that plural server processes are executed in parallel on the server 11 so as to receive requests from the plural clients.

Further, in the above description, the received image data is cached based on the GUID thereby the traffic on the network 12 is suppressed, however, other methods may be utilized. For example, if a medium such as a CD-ROM holding the file of image database in the server 11 in FIG. 11 is delivered to the respective clients, the same advantages can be attained. If an image is added to the image database in the server 11 after the delivery of generated CD-ROM, the client's CD-ROM lacks the corresponding image data, however, the client can request the image data not existing on the client from the server 11 in accordance with the above-described algorithm. Accordingly, this arrangement is effective even in a case where the image database is dynamically updated.

Further, in the client, as the feature amounts of the respective images are not necessary, it is not necessary to write the entire image database in the server 11 onto the CD-ROM. An image database, downsized by eliminating the feature amounts, can be written onto the CD-ROM.

Further, in the above description, the GUID is recorded in the image database, however, a file name based on the GUID may be attached to a file of image database. For example, a file name such as "63994E03-9B21-11D3-8B9D-00C04F6882F7.dat" is given, image data corresponding to GUID+image ID obtained from the image database can be specified. Otherwise, a name of directory holding the file of image database or a volume label of the CD-ROM may be determined based on the GUID.

Further, in the above description, to uniquely specify the database, the GUID is defined by the COM, however, the present invention is not limited to this definition. IDs defined by other methods may be used.

In this manner, according to the present embodiment, the amount of traffic between the client and the server (on the network) upon image search can be reduced by transmitting the feature amount of search image instead of transmitting the search image itself and by effectively utilizing an image cache of the client. Accordingly, in the client/server system, an image search can be efficiently performed on the image database.

SECOND EMBODIMENT

Hereinbelow, the image processing apparatus according to a second embodiment of the present invention will be described. Note that in the present embodiment, constituent elements corresponding to those of the first embodiment have the same reference numerals, and detailed explanations thereof will be omitted.

In the first embodiment, the search server is a server of image data (image server). However, it may be arranged such that the image server is distributed among plural locations, and the search server simply provides an index to an image. For example, a search site (e.g. Yahoo! or AltaVista) on the World Wide Web (WWW) provides an index to character data. The search service is made based on search for coincidence between a search target character string and a character string in HTML data of a Web site. In the second embodiment, such search service is replaced with a similar-image search, and a search server for performing a search for a Web site image is provided.

Figure 12:
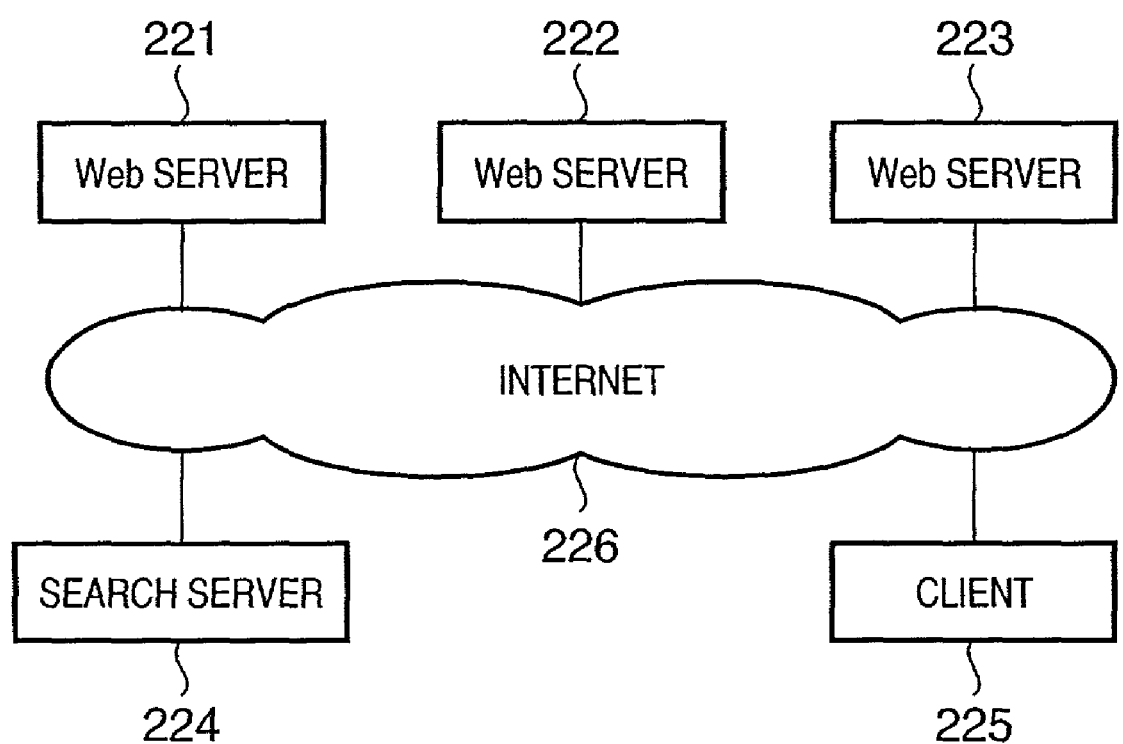
FIG. 12 is a block diagram explaining the relation among web servers, a search server and a client.

FIG. 12 is a block diagram explaining the relation among web servers, a search server and a client. Web servers 221, 222 and 223 provide Web pages including images on Internet 26. As described later, a search server 224 holds a feature amount of image data on each Web page and a link to the image data. Note that as an image search request from a client 225 and the process to perform an image search are similar to those in the first embodiment, explanations thereof will be omitted.

Figure 13:
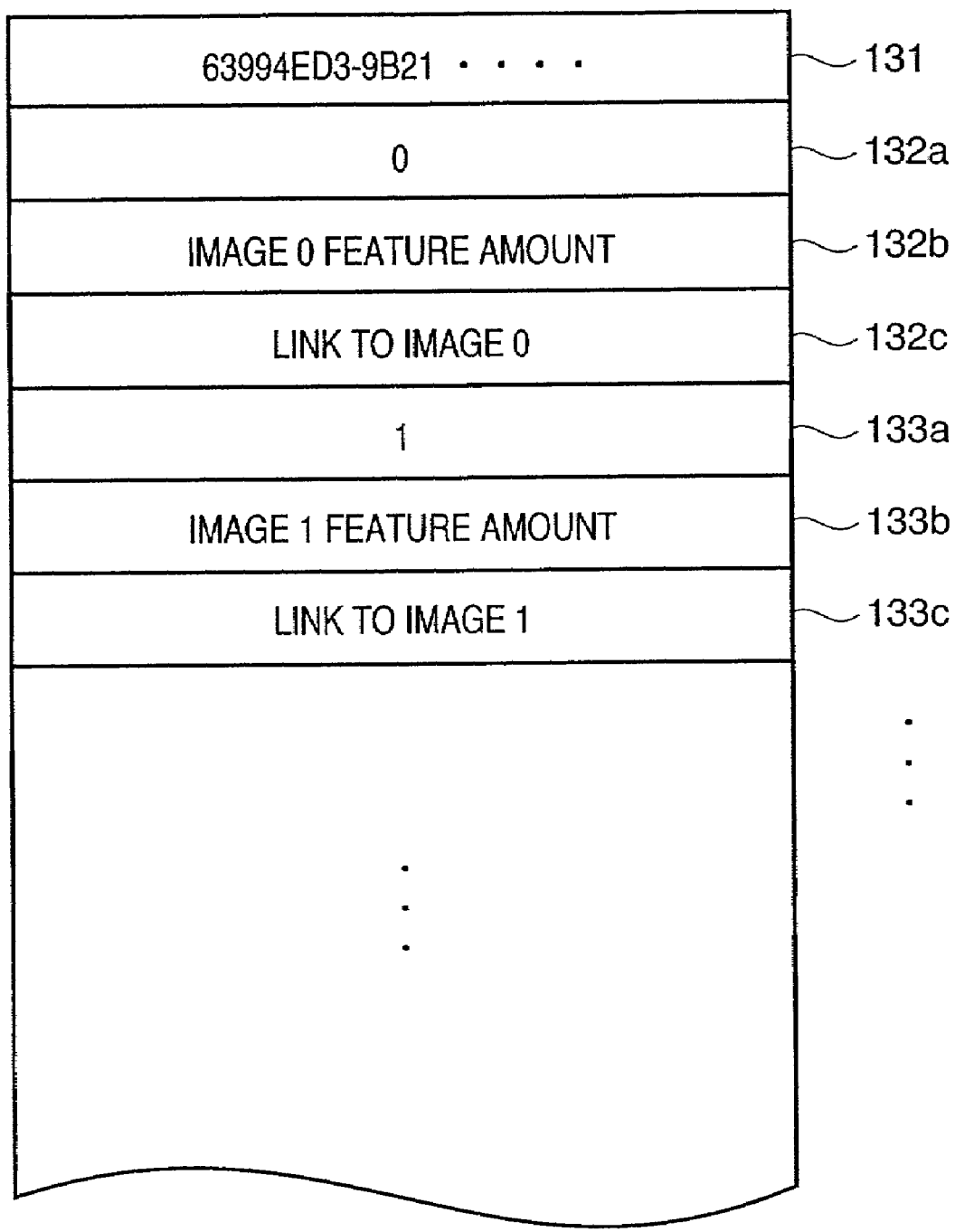
FIG. 13 is a table showing the structure of image database of the search server.

FIG. 13 is a table showing the structure of image database of the search server 224. Numeral 131 denotes a GUID; 132a to 132c, 133a to 133c, . . . , image IDs, image feature amounts and links to image data, respectively, in the database. Note that in FIG. 13, images having image IDs "0" and "1" are stored, however, the image IDs are not necessarily continuous numbers and they are not necessarily sequentially stored in the ascending order.

Different from the first embodiment, if image data is requested from the client 225, the search server 224 reads a corresponding link character string (e.g., character information such as http://www.webserver.com/image1.jpg) from the image database, and redirects the image data request to a Web server such as the Web server 121. Accordingly, an image provided by the Web server, matching the image search request, is displayed on a monitor screen of the client 225.

If the Web server can provide an image icon and/or reduced image, the search server 224 supplies a link character string to the image icon or reduced image to the client 225, so that the image icon or reduced image can be displayed on the monitor screen of the client 225. Further, if the search server 224 provides an image search function to the client 225 by a program such as Java (a trademark of Sun Microsystems, Inc.), the image search function similar to that in FIG. 2 can be provided.

In this manner, an image search server for searching Web site images for a similar image can be provided.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) storing software program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiment, and the storage medium storing the program code constitutes the invention.

Further, the storage medium, such as a floppy disk, a hard disk, an optical disk, a magneto-optical disk, a CD-ROM, a CD-R, a DVD, a magnetic tape, a non-volatile type memory card, and ROM can be used for providing the program code.

Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

As many apparently widely different embodiments of the present invention can be made without departing from the spirit and scope thereof, it is to be understood that the invention is not limited to the specific preferred embodiments described above thereof except as defined in the claims.

What is claimed is:

1. An image processing apparatus to communicate with a server using a user interface which accesses a search function of the server, to search an image database for an image, the image database storing plural images and feature amounts of the stored images, comprising:

a communication section, arranged to perform communication with the server;

a first input section, arranged to input an image;

an extractor, arranged to extract a feature amount from the image input by said first input section, wherein the feature amount indicates a feature of the input image;

a first transmitter, arranged to transmit the feature amount extracted by said extractor to the server through said communication section;

a receiver, arranged to receive information from the server through said communication section, wherein the received information indicates a search result based on the search function of the server, wherein the search function compares the feature amount transmitted by said first transmitter with each feature amount stored in the image database, and wherein the received information indicates at least one Globally Unique Identifier (GUID) defined by a Component Object Model (COM), wherein the GUID specifies the image database;

a first controller, arranged to display at least one reduced image on a monitor based on the search result indicated by the information received by said receiver;

a second input section, arranged to input a user's designation one of the at least one reduced image displayed on the monitor; and a second controller, arranged to request the server for an image based on the GUID, which corresponds to the reduced image designated by the user's designation, and to display the image, which is received from the server through said communication section in response to the request, on the monitor.

2. The apparatus according to claim 1, further comprising a memory, arranged to hold the image data received from the server, with a linkage to the ID; and a second transmitter, arranged to request image data not stored in said memory, based on the ID corresponding to the reduced image designated by the user.

3. The apparatus according to claim 2, wherein said memory is a removable medium.

4. The apparatus according to claim 1, further comprising an instruction section, arranged to enable the user to interactively designate the search image and the reduced image.

5. The apparatus according to claim 2, wherein the ID is stored in said memory.

6. A server apparatus for having a search function which is accessed by a user interface of a client, the search function to search an image database for an image, the image database storing plural images and feature amounts of the stored images, comprising:

a communication section, arranged to perform communication with the client using the user interface;

a first receiver, arranged to receive a feature amount indicating a feature of an image from the client through said communication section;

a search section, arranged to search the image database for images by using the search function, wherein the search function compares the feature amount received by said first receiver with each feature amount stored in the image database;

a first transmitter, arranged to transmit information indicating the search result of said search section and at least one Globally Unique Identifier (GUID) defined by a Component Object Model (COM), wherein the GUID specifies the image database, to the client through said communication section, wherein the client displays at least one reduced image corresponding to the search result indicated by the transmitted information;

a second receiver, arranged to receive a request, which includes the GUID, for image data from the client through said communication section, wherein the GUID included in the request corresponds to one of the at least one reduced image designated by a user's designation in the client;

a reader, arranged to read image data from the image database, wherein the image data corresponds to the GUID included in the request received by said second receiver; and a second transmitter, arranged to transmit the image data read by said reader to the client through said communication section.

7. A control method of an image processing apparatus which communicates with a server using a user interface which accesses search function of the server, to search an image database for an image, the image database storing plural images and feature amounts of the stored images, the method comprising the steps of:

inputting an image;

extracting a feature amount from the image input in the inputting step, wherein the feature amount indicates a feature of the input image;

receiving information from the server through the communication section, wherein the received information indicates a search result based on the search function of the server, wherein the search function compares the feature amount transmitted in the transmitting step with each feature amount stored in the database, and wherein the received information indicates at least one Globally Unique Identifier (GUID) defined by a Component Object Model (COM), wherein the GUID specifies the image database;

displaying at least one reduced image on a monitor based on the search result indicated by the information received in the receiving step;

inputting a user's designation which designates one of the at least one reduced image displayed on the monitor;

requesting the server for an image based on the GUID, which corresponds to the reduced image designated by the user's designation; and displaying the image, which is received from the server through the communication section in response to the request, on the monitor.

8. A control method of a server apparatus having search function which is accessed by a user interface of a client, the search function to search an image database for an image, the image database storing plural images and feature amounts of the stored images, the method comprising the steps of:

receiving a feature amount indicating a feature of an image from a client through a communication section of the server apparatus;

searching the image database for images by using the search function, wherein the search function compares the feature amount received in the receiving step with each feature amount stored in the image database;

transmitting information to the client through the communication section, wherein the transmitted information indicates the search result of the searching step and at least one Globaly Unique Identifier (GUID) defined by a Component Object Model (COM), wherein the GUID specifies the image database, wherein the client displays at least one reduced image corresponding to the search result indicated by the transmitted information;

receiving a request, which includes the GUID, for image data from the client through the communication section, wherein the GUID included in the request corresponds to one of the at least one reduced image designated by a user's designation in the client;

reading image data from the image database, wherein the image data corresponds to the GUID included in the request received in the second receiving step; and transmitting the image data read in the reading step to the client through the communication section.

* * * * *

UNITED STATES PATENT AND TRADEMARK OFFICE
CERTIFICATE OF CORRECTION

PATENT NO. : 7,146,382 B2
APPLICATION NO. : 10/125506
DATED : December 5, 2006
INVENTOR(S) : Kunihiro Yamamoto It is certified that error appears in the above-identified patent and that said Letters Patent is hereby corrected as shown below:

COLUMN 1:
Line 21, "image" should read -- the image --;
Line 34, "be" should be deleted;
Line 35, "always" should read -- always be --; and
Lines 47, 50 and 57, "search" should read -- the search --.

COLUMN 2:
Line 55, "server," should read -- server; --; and
Line 62, "there of" should read -- thereof --.

COLUMN 3:
Line 1, "client la" should read -- client 1$a$ --;
Line 28, "pencil" should read -- a pencil --; and
Line 40, "draws" should read -- drawing --.

COLUMN 4:
Line 17, "IDentifier" should read -- Identifier --; and
Line 24, "thereby" should read -- whereby --.

COLUMN 5:
Line 8, "variable" should read -- variables --;
Line 45, "positions" should read -- position --; and
Line 66, "18" should read --18 --.

COLUMN 6:
Line 24, "of feature amount," should read -- of the feature amount; --; and
Line 39, "Dr," should read -- DR, --.

COLUMN 7:
Line 35, "data," should read -- data; --; and
Line 62, "S(n)," should read -- S(n); --.

COLUMN 8:
Line 25, "1" should read -- 1 --;
Line 47, "stored," should read -- stored; --;
Line 50, "process," should read -- process; --;
Line 58, "thereby" should read -- whereby --;
Line 59, "suppressed," should read -- suppressed; --; and
Line 65, "data," should read -- data; --.

UNITED STATES PATENT AND TRADEMARK OFFICE
CERTIFICATE OF CORRECTION

PATENT NO. : 7,146,382 B2
APPLICATION NO. : 10/125506
DATED : December 5, 2006
INVENTOR(S) : Kunihiro Yamamoto It is certified that error appears in the above-identified patent and that said Letters Patent is hereby corrected as shown below:

COLUMN 9:
Line 10, "database," should read -- database; --;
Line 19, "COM," should read -- COM; --; and
Line 65, "stored," should read -- stored; --.

COLUMN 10:
Line 51, "are written" should read -- is written --.

COLUMN 12:
Line 18, "search" should read -- a search --.

Signed and Sealed this

Third Day of July, 2007

JON W. DUDAS
*Director of the United States Patent and Trademark Office*